United States Patent Office 2,783,660
Patented Mar. 5, 1957

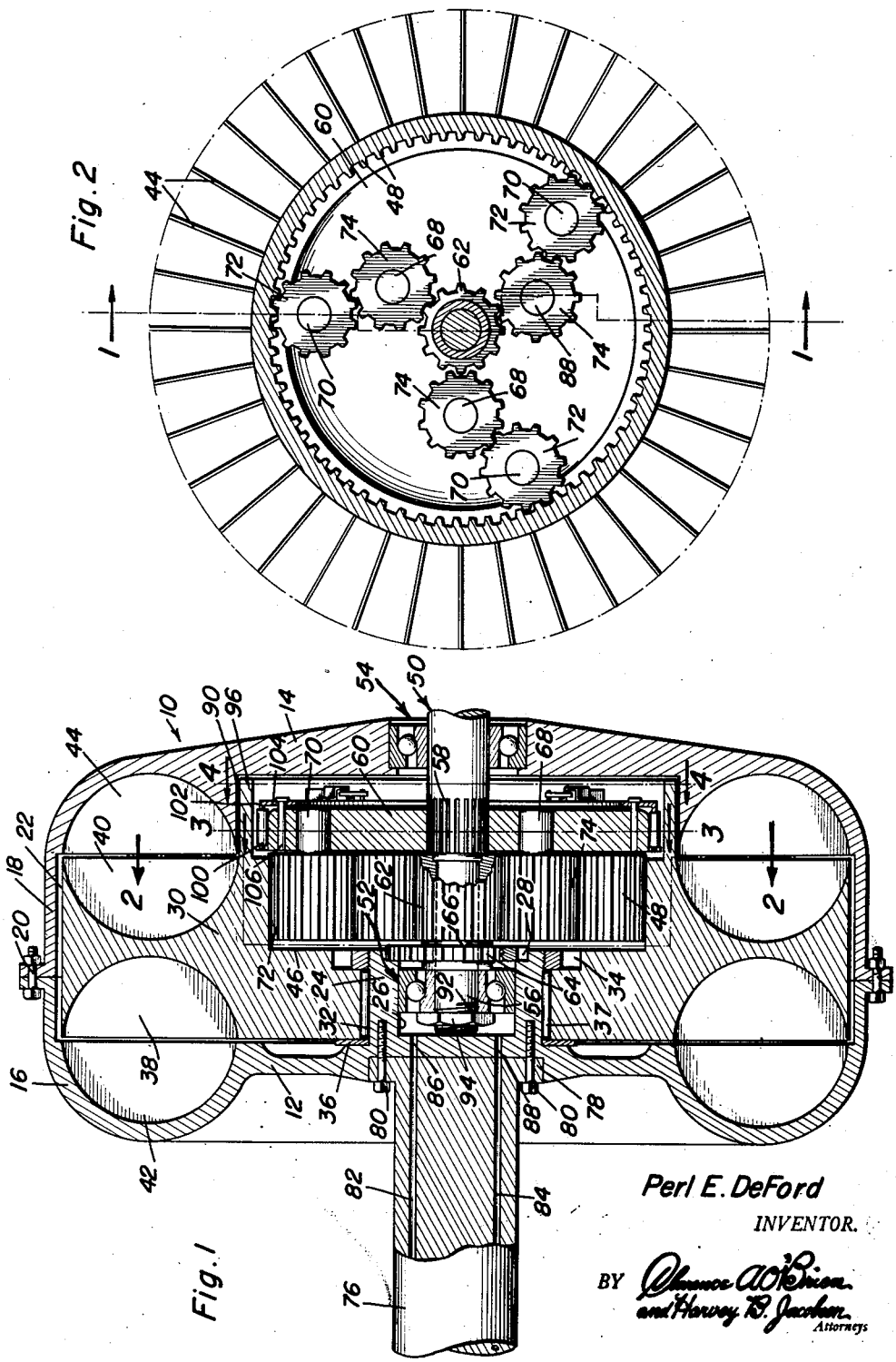

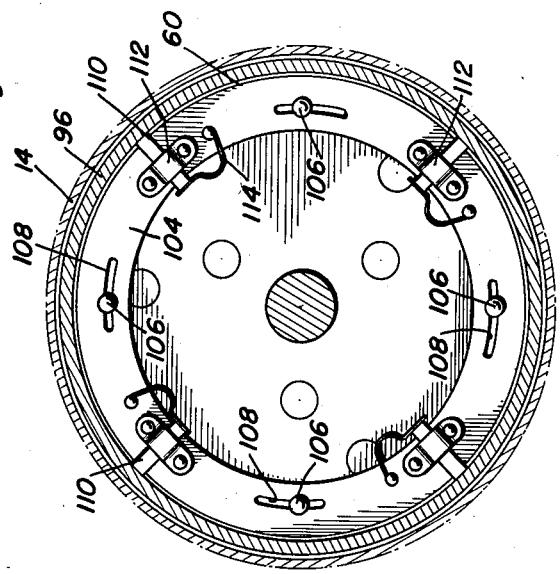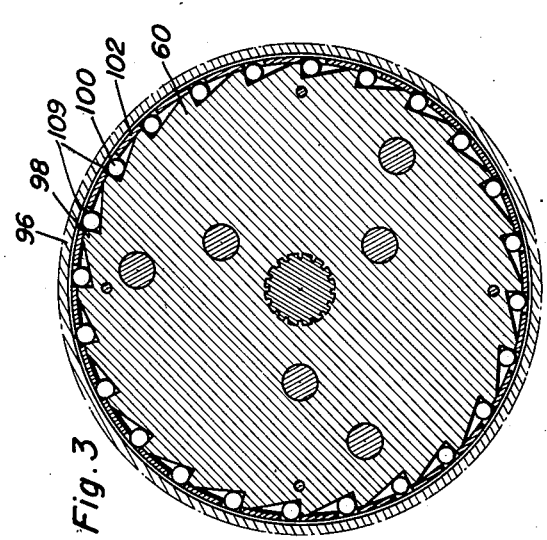

2,783,660

COMBINED HYDRAULIC AND PLANETARY GEAR TRANSMISSION

Perl E. De Ford, Twin Falls, Idaho, assignor of fifty percent to Emerson A. Tolman, Twin Falls, Idaho Application July 2, 1954, Serial No. 440,979

5 Claims. (Cl. 74—688)

This invention relates generally to power transmission mechanisms and pertains more particularly to an improved form of fluid coupling assembly incorporating a planetary new reduction unit therein for automatically varying the gear ratio between a driving and a driven shaft.

A primary object of this invention is to provide an improvement on the structure shown and described by copending application, Ser. No. 374,569, filed August 17, 1953, the improvement residing in the ease of assembly and disassembly of the present unit due to its compact form and improved construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal section substantially on line 1—1 of Figure 2 taken through the hydraulic drive constructed in accordance with the invention;

Figure 2 is a transverse sectional view taken substantially along the plane of section line 2—2 in Figure 1;

Figure 3 is a vertical section taken along the plane of section line 3—3 in Figure 1; and Figure 4 is a vertical section taken along the plane of section line 4—4 in Figure 1.

Referring now more particularly to the drawings, the drive unit will be seen to consist essentially of a casing indicated generally by the reference character 10 which is formed of two sections, each respectively having an end wall 12 or 14 and each having a peripheral flange 16 and 18, which are removably secured together as by fasteners 20 such that the casing is constructed with its end walls in spaced relation to present a chamber 22 therebetween. Integrally formed with the end wall 12 is a hub member 24 having a longitudinal recess 26 therein, the hub projecting from the end wall 12 into the chamber 22 and terminating short of the other end wall 14. The inner or free end of the hub is provided with internal teeth 28 for purposes which will be presently apparent.

An annular runner member 30 is journalled on the hub 24 by means of needle bearing members 32 and is retained on the hub by means of a hub member 34 suitably fitted onto the hub 24 and thrust washer 36 which is disposed on hub 24 between the runner member and the end wall 12. It will be seen that the width of the runner member is such that its opposite side surfaces are in closely spaced relation to the interior surfaces of the end walls 12 and 14 and it will be further noted that each side of the runner member is provided with runner means 38 and 40 which are in alignment with and cooperate with the impeller vane members 42 and 44 formed in the end walls 12 and 14 respectively. In this manner, a fluid coupling is formed between the casing 10 and the runner 30.

The side of the runner 30 adjacent the end wall 14 is recessed as at 46 and the gear teeth 48 are formed therein to present an internal ring gear. A pivot shaft member 50 projects through the end wall 14 and into the recess 26 of the hub 24 with a ball bearing assembly 52 journalling this shaft in the hub and a ball bearing assembly 54 journalling the shaft in the end wall 14. The inner end of the shaft 50 is provided with a portion 56 of reduced diameter which extends from the end thereof to the splined portion 58 which is supplied for the reception thereon of the carrier plate 60. A sun gear 62 is journalled on the portion 56 of the shaft 50 within the recess of the runner member and this sun gear is integrally connected with a spline member 64 through the collar portion 66. The spline 64 is engaged with the teeth 28 of the hub 24 so that the sun gear is directly coupled to the hub for rotation therewith.

The carrier plate 60 has the inner stub shafts 68 and the outer stub shafts 70 pivotally secured thereto and projecting laterally therefrom to provide journals for the outer pinion members 72 and the inner pinion members 74 as will be readily apparent from Figure 2.

A power drive shaft 76 is provided such that its flanged portion 78 is rigidly secured as by fasteners 80 to the casing assembly 10 and is provided with an oil supply line 82 and an oil return line 84 in alignment with the corresponding bores 86 and 88 in the hub member to assure a proper supply of oil within the chamber 22 for proper operation of the fluid coupling means.

It will be noted that the pinion thus formed is very compact in nature inasmuch as the carrier plate 60 is carried within a dished or recessed central portion 90 of the end wall 14 of the casing assembly and that the gear assembly is carried wholly within the confines of the runner member 30. The pinion of the journalled shaft 50 is threaded as at 92 for cooperation with a nut member 94 to properly position the bearing assembly 52 and it is to be noted that the bearing assembly 54 may be retained in the end wall 14 by means of a snap ring or any other suitable assembly for this purpose.

Also projecting into the recessed portion 90 of the end wall 14 is a cylindrical annular extension 96 of runner member 30 which is positioned between the carrier plate 60 and the recessed portion of the end wall. As seen most clearly in Figure 3, the carrier plate 60 is provided with a series of peripheral tapered teeth 98 which are of wedge-shaped configuration for cooperation with a series of rollers 100 positioned therein. The rollers 100 are held in proper position by an annular cage member which is of L-shaped configuration in cross section and which is provided with a peripheral flange portion 102 and a radial flange portion 104, the latter being carried by the carrier plate 60 by means of a plurality of fasteners such as rivets 106 or the like. The rivets or pins 106 loosely carry the cage member through the medium of projecting through the circumferentially elongated slots 108 therein, such as to permit a limited rotational movement between the cage and the carrier plate 60. The cage is provided in its peripheral flange portion 102 with a series of slots 109 within which the rollers 100 are carried.

Secured to the flange portion 104 of the cage are a plurality of friction members 110 arranged radially thereon and which are slidably received in suitable brackets 112 rigidly affixed to the flange 104. Spring members 114 engage the friction members 110 at their inner ends to normally urge these members into engagement with the inner surface of the extension 96.

Normally, when drive is being transmitted from the shaft 76 to the driven shaft 50, the carrier plate 60 will be rotating slower than the runner member 30, such that the extension 96, being a projection of the latter, will, by virtue of its engagement with the friction members 110 cause the cage to shift with respect to the carrier plates 60 such that the rollers 100 are positioned in the manner shown in Figure 3 wherein a free wheeling action is obtained between the carrier plates and the runners 30. However, whenever the shaft 76 is rotating at a slower speed than the shaft 50, such as when a vehicle is going down hill, the carrier plate 60 will rotate faster than the runner member 30 to shift the cage with respect to the carrier plate, by virtue of the friction members 110, to cause the rollers 100 to shift upwardly along the incline surfaces of the teeth 98 on the carrier plate to lock the carrier plate 60 to the runner member 30. Thus, the shaft 50 will tend to rotate the shaft 76 and the drag of the engine driving the shaft 76 will be imparted to the shaft 50, creating a braking action thereon.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A power transmission device comprising a casing having a pair of spaced end wall members defining a chamber therebetween, said casing including a centrally disposed hub projecting into said chamber from one of said end walls and terminating short of the other end wall, a runner member journalled on said hub and having its opposite sides disposed in closely spaced relation to the interior surfaces of said end walls, said opposite sides of said runner member and said interior surfaces of said end walls being provided with fluid coupling vanes whereby rotation of said casing will impart rotation to said runner, said other end wall being provided with a dished central portion and said runner member being provided with a recessed portion directly opposite thereto, a driven shaft projecting into said casing through said other end wall and having its inner end journalled in said hub, a carrier plate secured to said shaft and disposed within the dished portion of said other end wall, said runner member being provided with gear teeth in its recessed portion presenting an internal ring gear, a first pinion journalled on said carrier plate and engaged with said ring gear, a sun gear journalled on said shaft and drivingly connected to said hub, and a second pinion journalled to said carrier plate meshing with said sun gear and said first pinion, and means operatively connected to said carrier plate and said runner member for providing overrunning clutch and friction means between said carrier plate and said runner member.

2. A power transmission device comprising a casing having a pair of spaced end wall members defining a chamber therebetween, said casing including a centrally disposed hub projecting into said chamber from one end wall and terminating short of the other end wall, an annular runner member journalled on said hub and having its opposite sides disposed closely adjacent the inner faces of said end walls, said casing and said runner member having fluid coupling means for drivingly interconnecting the runner with the casing, said hub having a recess therein, a driven shaft journalled in said other end wall and projecting into the chamber with its runner end rotatably received in said hub, said inner member being formed with an internal ring gear, a sun gear coupled to said hub and journalled on said shaft, and a pair of intermeshed planet gears carried by said shaft rotatably supported on a carrier member in said recess, one of said planet gears mating with said sun gear and the other mating with said ring gear, and means operatively connected between said carrier and runner members for providing overrunning clutch and friction means between said members.

3. A power transmission device comprising a casing having a pair of spaced end wall members defining a chamber therebetween, said casing including a centrally disposed hub projecting into said chamber from one of said end walls and terminating short of the other end wall, a runner member journalled on said hub and having its opposite sides disposed in closely spaced relation to the interior surfaces of said end walls, said opposite sides of said runner member and said interior surfaces of said end walls being provided with fluid coupling vanes whereby rotation of said casing will impart rotation to said runner, said other end wall being provided with a dished central portion and said runner member being provided with a recessed portion directly opposite thereto, a driven shaft projecting into said casing through said other end wall and having its inner end journalled in said hub, a carrier plate secured to said shaft and disposed within the dished portion of said other end wall, said runner member being provided with gear teeth in its recessed portion presenting an internal ring gear, a first pinion journalled on said carrier plate and engaged with said ring gear, a sun gear journalled on said shaft and drivingly connected to said hub, and a second pinion journalled to said carrier plate meshing with said sun gear and said first pinion, said runner having an annular projection extending into said disked central portion of the other end wall in surrounding relation to said carrier plate, and overrunning clutch means between said carrier plate and said projection.

4. A power transmission device comprising a casing having a pair of spaced end wall members defining a chamber therebetween, said casing including a centrally disposed hub projecting into said chamber from one of said end walls and terminating short of the other end wall, a runner member journalled on said hub and having its opposite sides disposed in closely spaced relation to the interior surfaces of said end walls, said opposite sides of said runner member and said interior surfaces of said end walls being provided with fluid coupling vanes whereby rotation of said casing will impart rotation to said runner, said other end wall being provided with a dished central portion and said runner member being provided with a recessed portion directly opposite thereto, a driven shaft projecting into said casing through said other end wall and having its inner end journalled in said hub, a carrier plate secured to said shaft and disposed within the dished portion of said other end wall, said runner member being provided with gear teeth in its recessed portion presenting an internal ring gear, a first pinion journalled on said carrier plate and engaged with said ring gear, a sun gear journalled on said shaft and drivingly connected to said hub, and a second pinion journalled to said carrier plate meshing with said sun gear and said first pinion, said runner having an annular projection extending into said disked central portion of the other end wall in surrounding relation to said carrier plate, and overrunning clutch means between said carrier plate and said projection, said overrunning clutch means including a plurality of wedge shaped teeth in said carrier plate, a cage member secured to said carrier plate for limited rotation with respect thereto, and brake means carried by said cage in engagement with said projection.

5. A power transmission device comprising a casing having a pair of spaced end wall members dfining a chamber threbetween, said casing including a centrally disposed hub projecting into said chamber from one end wall and terminating short of the other end wall, an annular runner member journalled on said hub and having its opposite sides disposed closely adjacent the inner faces of said end walls, said casing and said runner member having fluid coupling means for drivingly interconnecting the runner with the casing, said hub having a recess therein, a driven shaft journalled in said other end wall and projecting into the chamber with its innner end rotatably received in said hub, said runner member being formed with an internal ring gear, a sun gear coupled to said hub and journalled on said shaft, and a pair of intermeshed planet gears carried on carrier means secured on said shaft, one of said planet gears mating with said sun gear and the other mating with said ring gear, and an overrunning clutch and friction means engageable between said carrier means and said runner member for substantially locking said carrier means to said runner member.

References Cited in the file of this patent

UNITED STATES PATENTS

| | | |
|---|---|---|
| 2,290,319 | Dodge | July 21, 1942 |
| 2,336,055 | Bacon | Dec. 7, 1943 |
| 2,371,371 | Watson | Mar. 13, 1945 |
| 2,493,408 | Keyser | Jan. 3, 1950 |
| 2,572,310 | Brown | Oct. 23, 1951 |

FOREIGN PATENTS

| | | |
|---|---|---|
| 144,142 | Sweden | Feb. 16, 1954 |